US012289809B2

(12) United States Patent
Taleb

(10) Patent No.: US 12,289,809 B2
(45) Date of Patent: Apr. 29, 2025

(54) METHOD FOR OPERATING AN AUTOMOTIVE LIGHTING DEVICE AND AUTOMOTIVE LIGHTING DEVICE

(71) Applicant: VALEO VISION, Bobigny (FR)

(72) Inventor: Rabih Taleb, Bobigny (FR)

(73) Assignee: Valeo Vision, Bobigny (FR)

( * ) Notice: Subject to any disclaimer, the term of this patent is extended or adjusted under 35 U.S.C. 154(b) by 70 days.

(21) Appl. No.: 18/250,548

(22) PCT Filed: Oct. 28, 2021

(86) PCT No.: PCT/EP2021/080060
§ 371 (c)(1),
(2) Date: Apr. 26, 2023

(87) PCT Pub. No.: WO2022/090430
PCT Pub. Date: May 5, 2022

(65) Prior Publication Data

US 2023/0403774 A1 Dec. 14, 2023

(30) Foreign Application Priority Data

Oct. 30, 2020 (FR) ...................................... 2011166

(51) Int. Cl.
*H05B 45/28* (2020.01)

(52) U.S. Cl.
CPC .................................... *H05B 45/28* (2020.01)

(58) Field of Classification Search
CPC ........ H05B 45/28; H05B 45/44; H05B 47/14; H05B 47/155; B60Q 1/02
See application file for complete search history.

(56) References Cited

U.S. PATENT DOCUMENTS 10,400,973 B1 * 9/2019 Espinosa ................ F21S 43/14
11,304,278 B2 4/2022 Hoffmann
(Continued)

FOREIGN PATENT DOCUMENTS

KR 1020200090882 A 7/2020
WO 2013056012 A1 4/2013
(Continued)

OTHER PUBLICATIONS

European Patent Office, International Search Report and Written Opinion of corresponding International Application No. PCT/EP2021/080060, dated Jan. 26, 2023.
(Continued)

*Primary Examiner* — Daniel D Chang
(74) *Attorney, Agent, or Firm* — Valeo Vision

(57) ABSTRACT

An automotive lighting device and a method for operating an automotive lighting device including at least one solid-state light source. The method includes defining a color allowance condition, feeding the light source with a current value which produces a luminous flux value higher than a minimum luminous flux threshold value, measuring the temperature in the light source, checking whether the output color satisfies the allowance condition and increasing or decreasing the current value, always keeping the current such as it produces a luminous flux value higher than the minimum luminous flux threshold value and producing a color which satisfies the allowance condition.

12 Claims, 2 Drawing Sheets

(56) References Cited

U.S. PATENT DOCUMENTS

| | | | | |
|---|---|---|---|---|
| 2013/0201677 | A1 | 8/2013 | Ter Weeme et al. | |
| 2014/0218953 | A1* | 8/2014 | Ungru | F21S 41/141<br>362/545 |

FOREIGN PATENT DOCUMENTS

| | | | |
|---|---|---|---|
| WO | 2020209294 | A1 | 10/2020 |
| WO | 2020209295 | A1 | 10/2020 |

OTHER PUBLICATIONS

Korean Patent Office, Office Action (with English translation) of corresponding Korean Patent Application No. 2023-7014121, dated Aug. 29, 2024.

Japan Patent Office, Office Action (with English translation) of corresponding Japanese Patent Application No. 2023-521964, dated Jun. 28, 2024.

* cited by examiner

METHOD FOR OPERATING AN AUTOMOTIVE LIGHTING DEVICE AND AUTOMOTIVE LIGHTING DEVICE

TECHNICAL FIELD

This invention is related to the field of automotive lighting devices, and more particularly, to the color management of these light sources comprised in these devices.

BACKGROUND OF THE INVENTION

Digital lighting devices are being increasingly adopted by car makers for middle and high market products.

These digital lighting devices usually comprise solid-state light sources, the operation of which heavily depends on temperature.

Temperature control in these elements is a very sensitive aspect, and is usually carried out by derating, which means decreasing the current value which feeds the light source so that the output flux and the operation temperature decreases accordingly. This causes that the performance of the light sources must be heavily oversized to face these overheating problems, so that the operation values may be decreased while still maintaining acceptable values.

Further, these techniques also affect to the color of the output pattern. This makes that, in some cases, for some temperature ranges, output color may be out of regulations.

SUMMARY OF THE INVENTION

This problem has been assumed until now, but a solution therefor is provided.

The invention provides an alternative solution for managing the output color of the light source patterns by a method for operating an automotive lighting device and an automotive lighting device.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for operating an automotive lighting device comprising at least one solid-state light source, the method comprising the steps of:

- defining a color allowance condition, wherein for each pair temperature-electrical current, a color is defined to be acceptable or not acceptable;
- establishing a minimum luminous flux threshold value and a maximum luminous flux threshold value;
- feeding the light source with a current value which produces a luminous flux value comprised between the minimum luminous flux thresh old value and the maximum luminous flux threshold value;
- measuring the temperature in the light source;
- obtaining the color of the light emitted by the light source, otherwise called the output color of the light source;
- checking whether the color obtained in the preceding step satisfies the allowance condition
- increasing or decreasing the fed current value, always keeping the current such as it produces a luminous flux value comprised between the minimum luminous flux threshold value and the maximum luminous flux threshold value and producing a color which satisfies the allowance condition.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

The color allowance condition is defined by means of datasheets and/or experimental data. For two given values of current and temperature, the output color of the light source may be obtained. This obtained output color may be within the regulations or not, since the regulations also provide a range of accepted and unaccepted colors. Hence, a pair current-temperature is considered to fulfil the allowance condition or not.

By means of this method, the light source is able to calculate if the output color is allowed or not, and may react to a non-allowed situation by modifying the feeding current, so that the color is always kept within the allowed zone.

In some particular embodiments, the step of obtaining the color of the light emitted by the light source is carried out using a datasheet and/or experimental data, which provides the color from the temperature and the fed current value.

There are many alternative ways of obtaining the output color of the light source. Sometimes, manufacturer's datasheets provide reliable and useful information about these parameters, but experimental data may also be used to obtain this allowance condition.

In some particular embodiments, the method further comprises the step of establishing a maximum luminous flux threshold value and the method includes keeping the current such as it produces a luminous flux value lower than the maximum luminous flux threshold value.

A maximum flux value is also useful to limit the luminous flux within the regulations.

In some particular embodiments, the minimum luminous flux threshold value and the maximum luminous flux threshold value are chosen to delimit a range of luminous flux values that correspond to a lighting function performed by the lighting device. Of course, this range of values respects the regulations in the field of automotive lighting.

In some particular embodiments, the step of measuring the light source temperature is carried out by a thermistor, such as a negative temperature coefficient thermistor.

A thermistor is a common element which may be employed to measure a temperature, thus providing a reliable starting point for this method.

In some particular embodiments, the step of increasing the fed current value involves increasing the current value from a first value to a second value, the second value being greater than the first value but lower than 1.1 times the first value, particularly lower than 1.05 times the first value and particularly lower than 1.03 times the first value.

In these examples, the intensity may be increased in small ranges, so that the current value (and the temperature) are kept as low as possible within a range which provides an acceptable performance. Further, color deviations may be corrected with the minimum impact possible on performance.

In some particular embodiments, the method further comprises the step of recording a sequence of current value increments for predetermined conditions.

This sequence may be useful if using a time-based pattern, to avoid a continuous temperature measurement.

In some particular embodiments, the steps of the method are applied to at least 10% of the light sources of the lighting device.

The progressive increase in the current value may be applied to a great number of light sources at the same time, for example, all the light sources providing a predetermined functionality. The power saving and homogeneous performance may therefore be applied to a great amount of elements.

In a second inventive aspect, the invention provides an automotive lighting device comprising:

- a matrix arrangement of solid-state light sources;
- a control element for performing the steps of the method according to the first inventive aspect.

This lighting device provides the advantageous functionality of efficiently managing the color performance of the light sources.

In some particular embodiments, the matrix arrangement comprises at least 2000 solid-state light sources.

BRIEF DESCRIPTION OF DRAWINGS

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, many light sources may be managed at the same time.

DETAILED DESCRIPTION OF THE INVENTION

Figure 1:
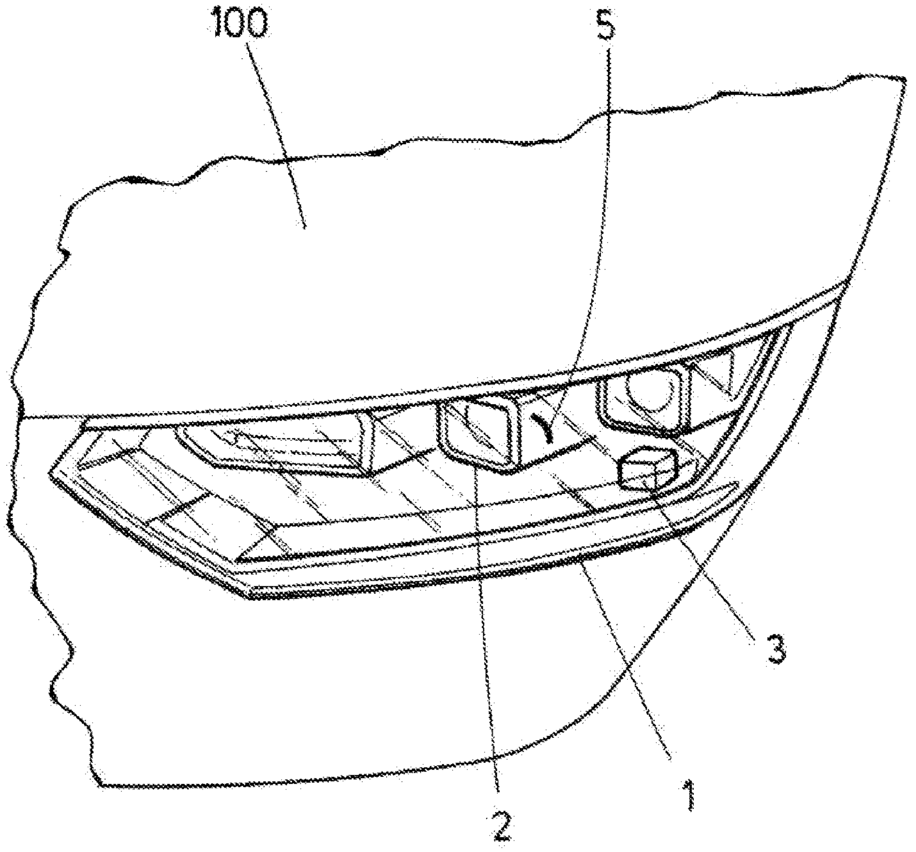
FIG. 1 shows a general perspective view of an automotive lighting device according to the invention.

In these figures, the following reference numbers have been used:

1 Lighting device
2 LED
3 Control element
4 Minimum luminous flux threshold value
41 First current value
42 Second current value
5 Thermistor
6 Non-allowance dots
7 Maximum luminous flux threshold value
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This lighting device 1 is installed in an automotive vehicle 100 and comprises

- a matrix arrangement of LEDs 2, intended to provide a light pattern;
- a control element 3 to perform a thermal control of the operation of the LEDs 2; and
- a thermistor 5 intended to measure the temperature in the LEDs 2.

This matrix configuration is a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometer.

The monolithic matrix is coupled to the control center so as to control the generation and/or the projection of a pixelated light beam by the matrix arrangement. The control center is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one solid-state light source emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control center.

In different embodiments, the matrix arrangement may comprise a scanning laser system wherein a laser light source, specifically a laser diode, emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

Figure 2:
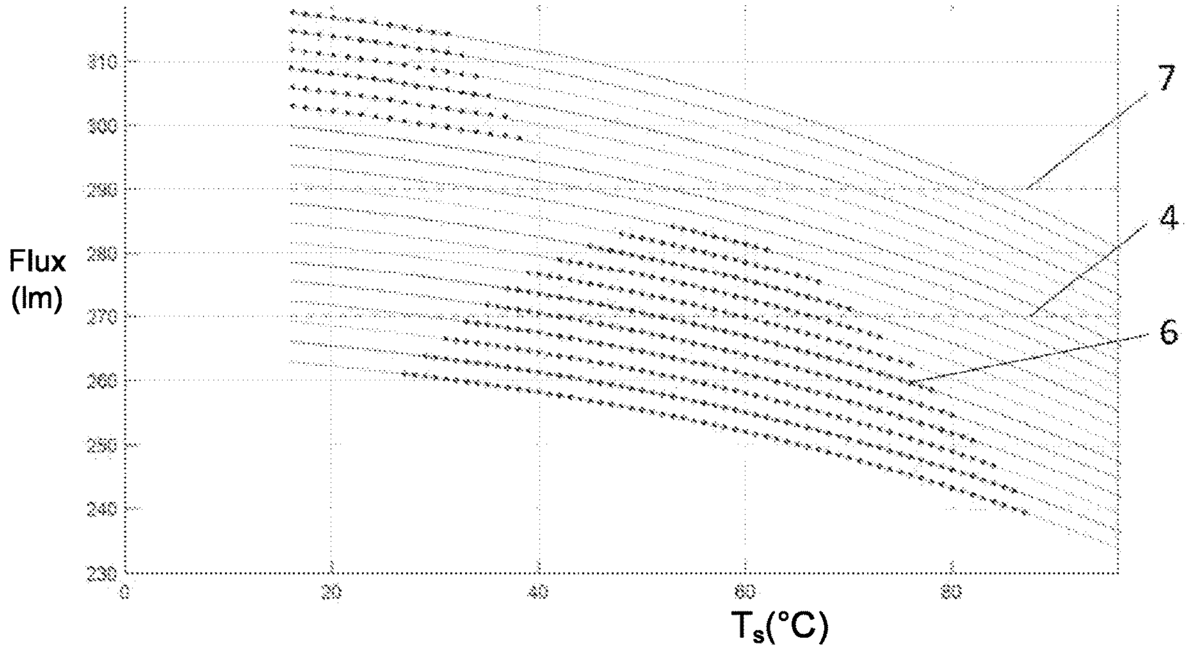
FIG. 2 shows a graphic scheme which represents the luminous flux values produced by the LED when fed by a particular electric current and is under a particular temperature.

FIG. 2 shows a graphic scheme which represents the luminous flux values produced by the LED when fed by a particular electric current and is under a particular temperature. Further, some non-allowance dots 6 have been added to this graph. The dots 6 represent combinations of current and temperature which provide a color which is not accepted by some automotive regulations.

In this graph, a minimum luminous flux threshold value 4 and a maximum flux threshold value 7 are also represented.

In this particular embodiment of the method according to the invention, the operation of the light source is controlled under some premises.

First one is that luminous flux should be kept between the minimum luminous flux threshold value 4 and the maximum luminous flux threshold value 7.

Second one is that the output color should fulfil the allowance condition, i.e., be kept out from the non-allowance dots 6 represented in the graph.

This performance is controlled by the amount of electrical current which is provided to the LED. The variation in the electrical current causes a variation of the luminous flux and a variation of the output color.

Hence, small variations are to be used, to provide an accepted performance in terms of color and luminous flux.

Figure 3:
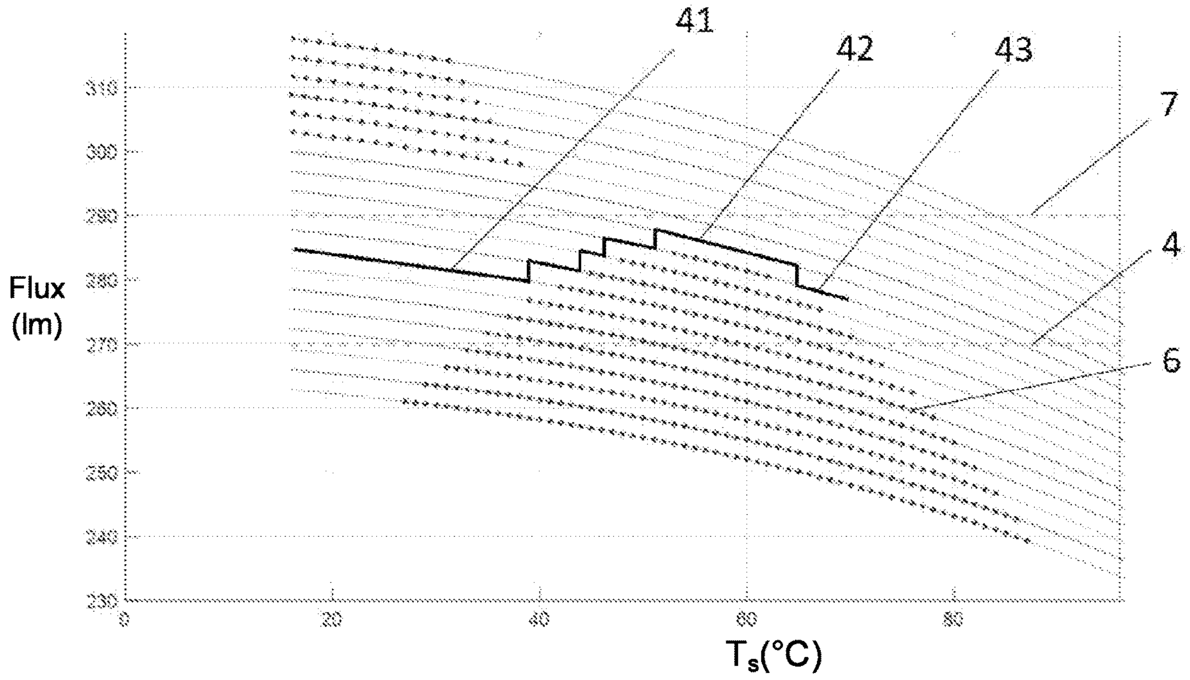
FIG. 3 shows an example of the evolution of the electric current in the LED in a method according to the invention.

FIG. 3 shows an example of the evolution of the electric current in the LED in a method according to the invention.

Firstly, when the temperature in the LED is still low, a first current value 41 is chosen, which is closer to the maximum threshold 7 than to the minimum threshold 4. This current value 41, paired with the temperature provides an output color which is also allowed, far from the non-allowance dots 6 represented in the graph.

While time passes, temperature increases, and the initial current value 41 provides a luminous flux which, although is still within the allowed values, is lower than the initial luminous flux. Further, the output color, being also acceptable, is closer to the non-allowance dots 6. Hence, current value is increased to a slightly higher value 42, so that the luminous flux is higher than the preceding one and the color is farther from the non-allowance dots.

However, in some cases, the current value may be decreased instead of increased. This is the case where, to avoid a non-allowance color zone, a high value of electric current is chosen. Then, when the non-allowance zone disappears, current may be decreased to a lower value 43 and still fulfil the allowance condition and ensuring a good luminous flux value.

The invention claimed is:

1. A method for operating an automotive lighting device comprising at least one solid-state light source, the method comprising:

- defining a color allowance condition for the solid-state light source, wherein for each pair temperature-electrical current, a color is defined to be acceptable or not acceptable;
- establishing a minimum luminous flux threshold value and a maximum luminous flux threshold value;
- feeding the light source with a current value which produces a luminous flux value comprised between the minimum luminous flux threshold value and the maximum luminous flux threshold value;
- measuring the temperature in the light source;
- obtaining the color of the light emitted by the light source, by using a datasheet, which provides the color from the measured temperature and the current value;
- checking whether the color obtained satisfies the allowance condition; and
- adjusting the current value, always keeping the current such as the solid-state light source produces a luminous flux value between the minimum luminous flux threshold value and the maximum flux threshold value and producing a color which satisfies the allowance condition.

2. The method according to claim 1, wherein measuring the temperature in the light source is carried out by a thermistor.

3. The method according to claim 1, wherein adjusting the current value involves increasing the current value from a first value to a second value, the second value being greater than the first value but lower than 1.1 times the first value.

4. The method according to claim 3, wherein adjusting the current value involves increasing the current value from a first value to a second value, the second value being lower than 1.05 times the first value.

5. The method according to claim 4, wherein adjusting the current value involves increasing the current value from a first value to a second value, the second value being lower than 1.03 times the first value.

6. The method according to claim 1, further comprising recording a sequence of current value increments for predetermined conditions.

7. The method according to claim 1, wherein the method is applied to at least 10% of the light sources of the lighting device.

8. The method according to claim 1, wherein the thermistor is a negative temperature coefficient thermistor.

9. An automotive lighting device comprising:

a matrix arrangement of solid-state light sources;

a control element configured to:

define a color allowance condition for the solid-state light source, wherein for each pair temperature-electrical current, a color is defined to be acceptable or not acceptable;

establish a minimum luminous flux threshold value and a maximum luminous flux threshold value;

feed the light source with a current value which produces a luminous flux value comprised between the minimum luminous flux threshold value and the maximum luminous flux threshold value;

measure the temperature in the light source;

obtain the color of the light emitted by the light source, by using a datasheet, which provides the color from the measured temperature and the current value;

check whether the color obtained satisfies the allowance condition; and adjust the current value, always keeping the current such as the solid-state light source produces a luminous flux value comprised between the minimum luminous flux threshold value and the maximum flux threshold value and producing a color which satisfies the allowance condition.

10. The automotive lighting device according to claim 9, wherein the matrix arrangement comprises at least 2000 solid-state light sources.

11. The automotive lighting device according to claim 9, further comprising a thermistor intended to measure the temperature of the solid-state light sources.

12. The automotive lighting device according to claim 11, wherein the thermistor is a negative temperature coefficient thermistor.

* * * * *